(12) United States Patent
Forsbom

(10) Patent No.: US 10,378,778 B2
(45) Date of Patent: Aug. 13, 2019

(54) HEATING MODULE AND METHOD OF MANUFACTURING THEREOF

(71) Applicant: Wenda Oy, Lieto (FI)

(72) Inventor: Jan Forsbom, Turku (FI)

(73) Assignee: Wenda Oy, Lieto (FI)

( * ) Notice: Subject to any disclaimer, the term of this patent is extended or adjusted under 35 U.S.C. 154(b) by 467 days.

(21) Appl. No.: 14/848,398

(22) Filed: Sep. 9, 2015

(65) Prior Publication Data

US 2017/0067653 A1    Mar. 9, 2017

(51) Int. Cl.
| | | |
|---|---|---|
| *F24D 3/12* | (2006.01) | |
| *F24D 13/02* | (2006.01) | |
| *E04F 15/02* | (2006.01) | |
| *H05B 3/22* | (2006.01) | |
| *B63J 2/12* | (2006.01) | |

(52) U.S. Cl.
CPC .............. *F24D 13/02* (2013.01); *E04F 15/02* (2013.01); *F24D 13/024* (2013.01); *H05B 3/22* (2013.01); *B63J 2/12* (2013.01); *H05B 2203/003* (2013.01); *H05B 2203/014* (2013.01); *H05B 2203/017* (2013.01); *H05B 2203/026* (2013.01); *H05B 2214/02* (2013.01); *Y02B 30/26* (2013.01)

(58) Field of Classification Search
CPC ..... F24D 3/12; F24D 3/14; F24D 3/16; F24D 3/127; F24D 3/145
USPC .......................... 219/213, 200, 201, 214, 209
See application file for complete search history.

(56) References Cited

U.S. PATENT DOCUMENTS

| | | | | |
|---|---|---|---|---|
| 4,508,162 A | * | 4/1985 | Radtke .............. | E04F 15/02405 165/49 |
| 6,294,768 B1 | * | 9/2001 | Liebich .................... | H05B 3/36 119/526 |
| 6,454,593 B1 | * | 9/2002 | Michelbach ......... | H01R 4/2433 439/412 |
| 6,621,983 B2 | * | 9/2003 | Thorin .................... | F24D 3/141 219/213 |
| 8,878,103 B2 | * | 11/2014 | Naylor .................... | F24H 1/185 219/213 |
| 8,899,546 B2 | * | 12/2014 | Mironov ................. | B29C 33/04 249/114.1 |

(Continued)

FOREIGN PATENT DOCUMENTS

| | | |
|---|---|---|
| GB | 1085535 A | 10/1967 |
| GB | 2061079 A | 5/1981 |

(Continued)

OTHER PUBLICATIONS

International Search Report and Written Opinion, Applicatiion No. PCT/FI2016/050611, dated Dec. 1, 2016, 12 pages.

*Primary Examiner* — Dana Ross
*Assistant Examiner* — Ayub A Maye
(74) *Attorney, Agent, or Firm* — Ziegler IP Law Group, LLC

(57) ABSTRACT

Disclosed is a heating module and a method of manufacturing thereof. The method comprises arranging a first conductive layer on a first surface of an intermediate insulating layer; making a channel on a second surface of the intermediate insulating layer; arranging a heating cable in the channel; filling the channel with a conductive filling material to cover the heating cable arranged in the channel; and attaching a second conductive layer to the second surface of the intermediate insulating layer with a conductive adhesive coating.

5 Claims, 9 Drawing Sheets

(56) References Cited

U.S. PATENT DOCUMENTS

| | | | | |
|---|---|---|---|---|
| 9,538,581 B2* | 1/2017 | Naylor | | H05B 1/0244 |
| 2007/0039609 A1* | 2/2007 | Huebner | | E04C 2/525 |
| | | | | 126/570 |
| 2009/0026192 A1 | 1/2009 | Fuhrman | | |
| 2010/0095613 A1* | 4/2010 | Paetkau | | E04B 1/14 |
| | | | | 52/220.1 |
| 2010/0176118 A1* | 7/2010 | Lee | | H05B 3/34 |
| | | | | 219/549 |
| 2010/0282442 A1* | 11/2010 | Sukuvoy | | B32B 15/06 |
| | | | | 165/104.19 |
| 2011/0272392 A1* | 11/2011 | Dohring | | F24D 13/024 |
| | | | | 219/213 |

FOREIGN PATENT DOCUMENTS

| | | |
|---|---|---|
| GB | 2456182 A | 7/2009 |
| JP | S59225229 A | 12/1984 |
| WO | 8501632 A1 | 4/1985 |
| WO | 2011033324 A1 | 3/2011 |

\* cited by examiner

HEATING MODULE AND METHOD OF MANUFACTURING THEREOF

TECHNICAL FIELD

The present disclosure relates generally to a heating arrangement; and more specifically, to a heating module for heating a floor area and a method for manufacturing such heating module.

BACKGROUND

In cold regions, various kinds of heating arrangements are used. For example, a heating arrangement is used for heating a floor area, such as a floor or stairs of buildings and transportation means, which are exposed to very cold and icy weather conditions. Generally, such heating arrangement includes heating cables arranged in the form of loops and encapsulated with protective layers for being placed under floor area. In use, the heating arrangement is electrically coupled to an electrical power source for allowing electricity to pass though the heating cables for warming the floor area.

Typically, for implementing such heating arrangement, heating cables are embedded in a floor area. For example, in case of buildings, the heating cables are embedded in a material (for example concrete) below final finished floor. Thereafter, the heating cables (embedded in the concrete) are covered with a protective layer to form the final finished floor. Therefore, installing such heating arrangement is a complex and costly procedure. Also, maintenance (or repairing) of such heating arrangement is equally complex and costly procedure. For example, to replace a damaged (or broken) heating cable, the floor area needs to be broken and made again. Similarly, if such heating arrangements are used with other floor areas, such as in decks of ships, docks or train platforms, the process of installing and maintaining such heating arrangements remain same.

Therefore, in light of the foregoing discussion, there exists a need to overcome the aforementioned drawbacks of the conventional heating arrangement.

SUMMARY

The present disclosure seeks to provide a method for manufacturing a heating module.

The present disclosure further seeks to provide a heating module for heating a floor area.

The present disclosure further seeks to provide a heating arrangement for heating a floor area.

In one aspect, an embodiment of the present disclosure provides a method for manufacturing a heating module, the method comprising:
  arranging a first conductive layer on a first surface of an intermediate insulating layer;
  making a channel on a second surface of the intermediate insulating layer;
  arranging a heating cable in the channel;
  filling the channel with a conductive filling material to cover the heating cable arranged in the channel; and
  attaching a second conductive layer to the second surface of the intermediate insulating layer with a conductive adhesive coating.

In another aspect, an embodiment of the present disclosure provides a heating module for heating a floor area, the heating module comprising:
  a first conductive layer;
  a second conductive layer positioned opposite to the first conductive layer;
  an intermediate insulating layer positioned between the first and the second conductive layers, the intermediate insulating layer comprising
    a channel on a surface of the intermediate insulating layer, positioned adjacent to the second conductive layer,
    a heating cable received in the channel, and
    a conductive filling material filling the channel and covering the heating cable; and
  a conductive adhesive coating between the second conductive layer and the surface of the intermediate insulating layer.

In yet another aspect, an embodiment of the present disclosure provides a heating arrangement for heating a floor area, the heating arrangement comprising:
  a plurality of heating modules, each of the plurality of heating module comprising
    a first conductive layer,
    a second conductive layer positioned opposite to the first conductive layer,
    an intermediate insulating layer positioned between the first and the second conductive layers, the intermediate insulating layer comprising
      a channel on a surface of the intermediate insulating layer, positioned adjacent to the second conductive layer,
      a heating cable received in the channel, and
      a conductive filling material filling the channel and covering the heating cable, and
    a conductive adhesive coating between the second conductive layer and the surface of the intermediate insulating layer; and
  an electrical cable electrically coupled to at least one of the heating modules for providing electrical power from a power source to the heating modules, wherein sealing layers of the heating modules are adapted to be rested on the floor area.

Embodiments of the present disclosure substantially eliminate or at least partially address the aforementioned problems in the prior art, and enables easy installation and repair of a heating arrangement.

Additional aspects, advantages, features and objects of the present disclosure would be made apparent from the drawings and the detailed description of the illustrative embodiments construed in conjunction with the appended claims that follow.

It will be appreciated that features of the present disclosure are susceptible to being combined in various combinations without departing from the scope of the present disclosure as defined by the appended claims.

BRIEF DESCRIPTION OF THE DRAWINGS

The summary above, as well as the following detailed description of illustrative embodiments, is better understood when read in conjunction with the appended drawings. For the purpose of illustrating the present disclosure, exemplary constructions of the disclosure are shown in the drawings. However, the present disclosure is not limited to specific methods and instrumentalities disclosed herein. Moreover, those in the art will understand that the drawings are not to scale. Wherever possible, like elements have been indicated by identical numbers.

Embodiments of the present disclosure will now be described, by way of example only, with reference to the following diagrams wherein.

Figure 1:
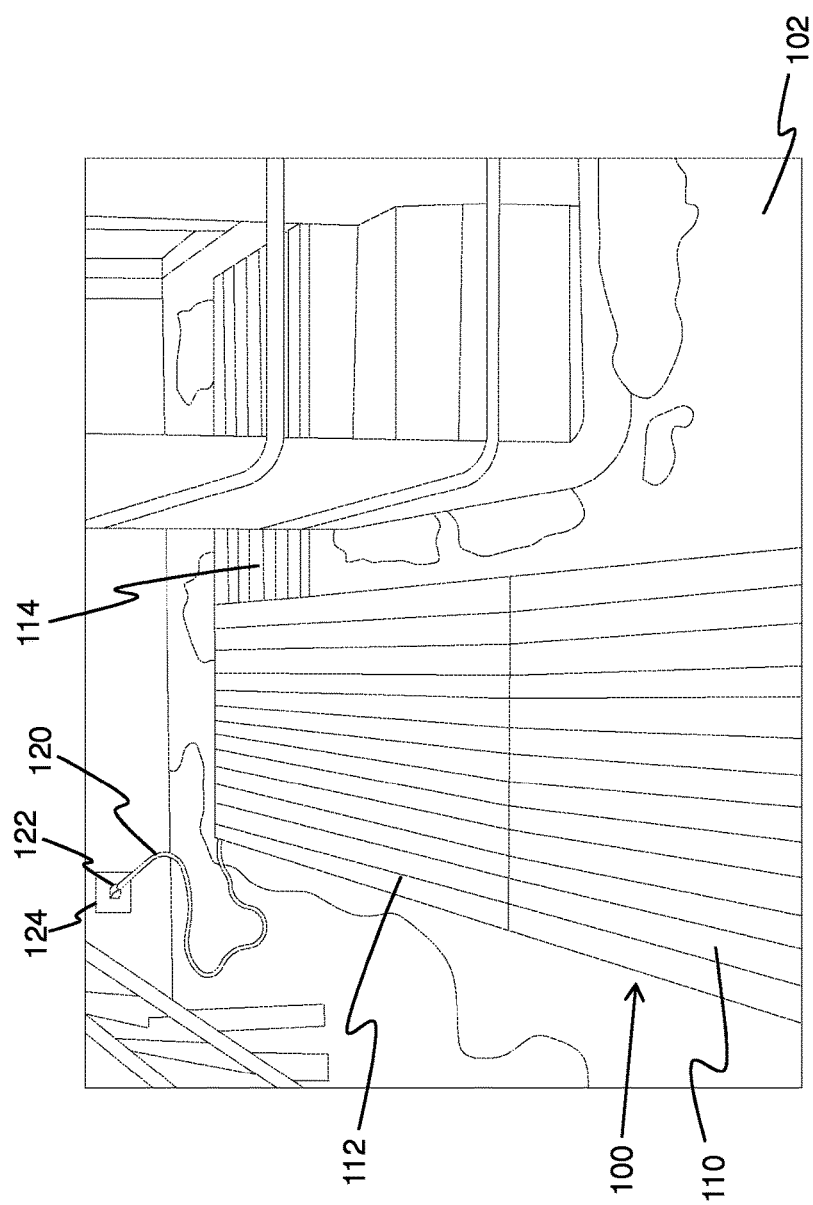
FIG. 1 is a schematic illustration of an environment in which a heating arrangement of the present disclosure may be practiced, in accordance with an embodiment of the present disclosure.

In the accompanying drawings, an underlined number is employed to represent an item over which the underlined number is positioned or an item to which the underlined number is adjacent. A non-underlined number relates to an item identified by a line linking the non-underlined number to the item. When a number is non-underlined and accompanied by an associated arrow, the non-underlined number is used to identify a general item at which the arrow is pointing.

DETAILED DESCRIPTION OF EMBODIMENTS

The following detailed description illustrates embodiments of the present disclosure and ways in which they can be implemented. Although some modes of carrying out the present disclosure have been disclosed, those skilled in the art would recognize that other embodiments for carrying out or practicing the present disclosure are also possible.

In an aspect, an embodiment of the present disclosure provides a method for manufacturing a heating module, the method comprising:
arranging a first conductive layer on a first surface of an intermediate insulating layer;
making a channel on a second surface of the intermediate insulating layer;
arranging a heating cable in the channel;
filling the channel with a conductive filling material to cover the heating cable arranged in the channel; and
attaching a second conductive layer to the second surface of the intermediate insulating layer with a conductive adhesive coating.

In another aspect, an embodiment of the present disclosure provides a heating module for heating a floor area, the heating module comprising:
a first conductive layer;
a second conductive layer positioned opposite to the first conductive layer;
an intermediate insulating layer positioned between the first and the second conductive layers, the intermediate insulating layer comprising
a channel on a surface of the intermediate insulating layer, positioned adjacent to the second conductive layer,
a heating cable received in the channel, and
a conductive filling material filling the channel and covering the heating cable; and
a conductive adhesive coating between the second conductive layer and the surface of the intermediate insulating layer.

In yet another aspect, an embodiment of the present disclosure provides a heating arrangement for heating a floor area, the heating arrangement comprising:
a plurality of heating modules, each of the plurality of heating module comprising
a first conductive layer,
a second conductive layer positioned opposite to the first conductive layer,
an intermediate insulating layer positioned between the first and the second conductive layers, the intermediate insulating layer comprising
a channel on a surface of the intermediate insulating layer, positioned adjacent to the second conductive layer,
a heating cable received in the channel, and
a conductive filling material filling the channel and covering the heating cable, and
a conductive adhesive coating between the second conductive layer and the surface of the intermediate insulating layer; and
an electrical cable electrically coupled to at least one of the heating modules for providing electrical power from a power source to the heating modules, wherein sealing layers of the heating modules are adapted to be rested on the floor area.

According to an embodiment, the heating arrangement of the present disclosure may be used in cold regions, for example, on floor areas of buildings and transportation means that are exposed to very cold and icy weather conditions. Specifically, the heating arrangement is adapted to heat the floor area in order to keep the floor area relatively dry (without ice) and non-slippery. Also, the heating arrangement may enable in keeping any closed area warm or provide warmth to people using such floor area.

In one embodiment, the term "floor area" used herein relates to any walkable (or accessible) area of a building, such as a floor, a corridor or steps of the building. Alternatively, the floor area may include any area outside a building, such as a small passage that connects adjacent buildings or a building to a main road. Moreover, the floor area may be associated with a floor, a corridor or the steps of the transportation mean, such a ship, a train or a truck. For example, the floor area can be steps or floor of a heavy duty truck, a deck of the ship, a dock, a train platform and the like.

According to another embodiment, the heating arrangement of the present disclosure may be used by mounting them on walls or a ceiling of the buildings or the transportation means.

The heating arrangement comprises a plurality of heating modules. Specifically, the heating arrangement includes a sufficient number of heating modules that can suitably cover the floor area (explained herein above).

In one embodiment, the heating module may be configured to have a rectangular shape. Alternatively, the heating module may be configured to have a circular, oval or any polygonal shape. Therefore, the heating arrangement may include heating modules having similar shape or different shapes.

The plurality of heating modules may be electrically coupled to each other. According to another embodiment, each heating module is directly coupled to a power source. For example, the plurality of heating modules may be coupled to each other using small electrical cables. Further, the plurality of heating modules can be electrically coupled to each other such that the heating modules may be placed adjacent to each other for covering the floor area. For example, a cascade of heating modules may be formed to cover the floor area.

Further, an electrical cable is electrically coupled to at least one of the heating modules for providing electrical power from a power source to the heating modules. In an example, the electrical cable may be an elongated electrical cable having an electrical plug arranged at one end, and other end being electrically coupled to the at least one of the heating modules. The electrical coupling may also be carried out by directly coupling the electrical wire to a power socket or to In another embodiment, each heating module is electically coupled to an electrical cable, or a part of the heating modules are electrically coupled to an electrical cable and another part of the heating modules are electrically coupled to each other. In an example, the power source may be residential electrical supply (such as 12, 24, 220 or 240 volts). Alternatively, the power source may be electrical supply provided by engines of the transportation mean which may run on petrol, diesel, steam and the like.

In one embodiment, the heating module, which is coupled to the electrical cable, comprises a seal element for providing sealed connection between the heating module and the electrical cable. In an example, the seal element may be a bolt or a bushing, arranged on the heating module. The seal element provides a through opening, which can receive an end of the electrical cable therethrough for being electrically and sealingly (or water-tightly) coupled with a heating cable of the heating module, which is explained further in greater detail.

Each of the heating modules of the heating arrangement comprises a first conductive layer. In an example, the first conductive layer may be configured to have a hollow rectangular frustum like structure with nominal wall height. Alternatively, the first conductive layer may be configured to have a hollow rectangular (or circular or oval or polygonal) box like structure having nominal wall height. In an embodiment, the first conductive layer may be made using a suitable manufacturing process, such as casting, moulding, forming and machining. Further, the first conductive layer may be made of a material selected from the group consisting of fibre reinforced plastic, aluminium, steel, stainless steel and combinations thereof.

The heating module also comprises a second conductive layer. In an example, the second conductive layer may be configured to have a hollow rectangular box like structure with nominal wall height (such as a rectangular tray). Alternatively, the second conductive layer may be configured to have a hollow frustum (or circular or oval or polygonal) box like structure having nominal wall height. In an embodiment, the second conductive layer may be made using a suitable manufacturing process, such as casting, moulding, forming and machining. Further, the second conductive layer may be made of a material selected from the group consisting of aluminium, steel, stainless steel and combinations thereof.

Further, the second conductive layer is positioned opposite to the first conductive layer. In an example, the first conductive layer may be smaller in size as compared to a size of the second conductive layer, therefore when walls of the first conductive layer rest on a base of the second conductive layer, a cavity is formed therebetween.

The heating module further comprises an intermediate insulating layer positioned between the first and the second conductive layers. Specifically, the intermediate insulating layer is configured to be received in the cavity between the first and the second conductive layers. For example, the intermediate insulating layer may be configured to have a shape of rectangular frustum like structure, conforming to the shape of the hollow rectangular frustum like structure of the first conductive layer. This allows the intermediate insulating layer to be suitably received in the cavity between the first and the second conductive layers.

According to an embodiment, the intermediate insulating layer may be made of a material selected from the group consisting of polyurethane, polystyrene, polyvinyl chloride and combinations thereof.

The intermediate insulating layer comprises a channel on a surface of the intermediate insulating layer, positioned adjacent to the second conductive layer. Specifically, the channel is made on a second surface, of the intermediate insulating layer, positioned adjacent to the second conductive layer; and a first surface of the intermediate insulating layer is arranged on the first conductive layer.

In an embodiment, the channel may be made on the intermediate insulating layer by a computer numerical control (CNC) machining. Otherwise, the channel may be made manually using machining process such as milling and the like. Additionally, the intermediate insulating layer may be moulded in a manner such that the channel is formed on the second surface of the intermediate insulating layer.

In an embodiment, the channel may be a continuous loop (for example in a rounded and zigzag manner) configured to cover a maximum area of the second surface of the intermediate insulating layer. Further, the channel may be configured to have a triangular shape. Otherwise, the channel may be configured to have a semicircular or a square shape.

The intermediate insulating layer also comprises a heating cable received in the channel. Specifically, the heating cable may include a length such that the heating cable may be accommodated along an entire length of the channel forming a continuous loop. The heating cable comprises a connector element arranged at a first end of the heating cable. The connector element is adapted to be connected to the electrical cable for receiving electrical power therethrough. As mentioned above, the seal element provides a sealed connection between the heating module and the electrical cable, particularly the seal element provides a sealed connection between the electrical connector of the heating cable and the end of the electrical cable. The electrical cable also includes a termination point at a second end thereof. The termination point may serve as a termination point for the heating cable or as a junction point for another heating module.

The intermediate insulating layer also comprises a conductive filling material filling the channel and covering the heating cable. Specifically, the conductive filling material is used in a sufficient quantity such that the channel is filled to a level of the second surface and covers the heating cable received in the channel. In an embodiment, the conductive filling material provides mechanical strength and conducts heat. In one embodiment, the conductive filling material is concrete. Alternatively, the conductive filling material may be a composition of two materials mixed together, for example, metals particles or other material having good thermal conductivity glued together.

The heating module further comprises a conductive adhesive coating between the second conductive layer and the surface of the intermediate insulating layer. The conductive adhesive coating is adapted to attach (or couple) the second surface of the intermediate insulating layer with the second conductive layer. In one embodiment, the conductive adhesive coating may be made of a material selected from the group consisting of polyurethane adhesive, synthetic resin, vinyl polymers, polyester, vinyl ester and combinations thereof.

According to an embodiment, the heating module further comprises a sealing layer arranged on a surface of the first conductive layer opposite to the intermediate insulating layer. Specifically, a sealing material is applied on the surface and edges of the first conductive layer for coupling the first and second conductive layers with the intermediate insulating layer therebetween. In an embodiment, the sealing layer may be configured to be thicker along the edges as compared to the surface of the first conductive layer. In such instance, the second conductive layer remains open, i.e. not covered by the sealing layer.

According to another embodiment, the heating module further comprises a sealing layer covering edges of the first conductive layer, the intermediate insulating layer and the second conductive layer. Specifically, when the intermediate insulating layer is attached with the second conductive layer with the conductive adhesive coating, the assembly of the second conductive layer, the intermediate insulating layer and the first conductive layer may be sealed using a sealing material. For example, the assembly of the first and second conductive layers (with the intermediate insulating layer therebetween) may be dipped in (or coated with) the sealing material to form the sealing layer around entire heating module. This makes the heating module a complete sealed unit, except an opening provided by the seal element for enabling electrical connection between the heating cable and the electrical cable.

In one embodiment, the sealing material may be made of a material selected from the group consisting of polyurethane adhesive, synthetic resin, vinyl polymers, polyester, vinyl ester and combinations thereof.

In use, the sealing layers of the heating modules (of the heating arrangement) are adapted to be rested on the floor area. This allows the second conductive layers to face upward and act as walkable surface.

In an embodiment, the second conductive layer of the heating module is configured in a manner such that the walls of the second conductive layer stay away from a surface of the floor area, when the heating module is rested on the floor area. For example, the second conductive layer of the heating module may be configured to have a distance of about 2 mm-10 mm from the surface of the floor area. This allows the second conductive layer of the heating module to stay away from a metallic deck of the ship for avoiding any electrical pairing therebetween and corrosion thereof.

Further, the electrical cable may be electrically coupled to the power source for providing electrical energy to the heating cable, which in turn converts the electrical energy into heat energy. Accordingly, the second conductive layers (facing upward) dissipate heat from at least top thereof. Additionally, the second conductive layers may dissipate heat from sides (for example walls) thereof. Moreover, the sealing layers, resting on the floor area, may also dissipate heat therefrom. This allows the heating arrangement of the present disclosure to heat the floor area in order to keep the floor area relatively dry and non-slippery, or to keep any closed area warm or to provide warmth to people using such floor area.

In another aspect, the heating module of the present disclosure may be manufactured using a method having following steps. For example, the method for manufacturing the heating module may begin with modifying an insulating material to form the intermediate insulating layer. For example, the insulating material (such as foam, cellulose, fibres and the like) may be provided a shape, such as a rectangular frustum like structure having a first surface and a second surface opposite to the first surface, with the help of tools such as cutter or saw. Thereafter, the intermediate insulating layer may be placed on surface, such as table or desk, with the first surface therefore facing upward.

Further, the first conductive layer may be applied (or placed) on the first surface of the intermediate insulating layer, and thereafter vacuum laminated. Alternatively, manual lamination or another lamination technique may be applied for arranging the first conductive layer on the first surface of the intermediate insulating layer. Thereafter, the assembly of the first conductive layer and intermediate insulating layer may be turned around, such that the second surface of the intermediate insulating layer face upward.

Further, the channel may be made into the second surface of the intermediate insulating layer. For example, the channel may be made using CNC machining or manual machining, such as milling and the like. Thereafter, the heating cable may be placed in the channel for being accommodated therein. Furthermore, the conductive filling material may be poured into the channel to encapsulate the heating cable and to fill the channel.

The second surface of the intermediate insulating layer is attached with the second conductive layer using a conductive adhesive coating. Specifically, the first conductive layer along with intermediate insulating layer is turned around and placed on the second conductive layer with the conductive adhesive coating between the second surface of the intermediate insulating layer and the second conductive layer. This attaches the intermediate insulating layer and the second conductive layer.

Thereafter, the sealing layer made of the sealing material is arranged on the surface of the first conductive layer opposite to the intermediate insulating layer. Specifically, the sealing material is applied on the surface and edges of the first conductive layer for coupling the first and second conductive layers with the intermediate insulating layer therebetween. Alternatively, the sealing layer may be configured to cover edges of the first conductive layer, the intermediate insulating layer and the second conductive layer. Specifically, the assembly of the first and second conductive layers, with the intermediate insulating layer therebetween, may be dipped into the sealing material and allowed to harden to form the sealing layer around the entire heating module.

The method may further comprise sealing edges of the layers together with a sealing material, to form a sealing layer covering edges of the first conductive layer, the intermediate insulating layer and the second conductive layer. If any further layers are used, these would then also be covered by the sealing layer. The method may yet further comprise arranging a sealing layer made of a sealing material on a surface of the first conductive layer opposite to the intermediate insulating layer. This step forms a sealing layer arranged on the surface of the first conductive layer that is opposite to the intermediate insulating layer.

The present disclosure provides a heating module, a heating arrangement having a plurality such heating modules and a method of manufacturing such heating module. The heating arrangement may be used for keeping a floor area relatively dry and non-slippery. Also, the heating arrangement may enable in keeping any closed area warm or provide warmth to people using such floor area. Further, the heating arrangement of the present disclosure is modular in nature and thus provides uniform heating along the floor area. Furthermore, the heating arrangement is easy to install and repair in case of any damage. Moreover, during repairing it is easier to find a faulty area of the heating arrangement because of its modular nature. Additionally, the heating modules of the present disclosure are easy to manufacture and may be suitability used in severe (or rough) conditions.

DETAILED DESCRIPTION OF THE DRAWINGS

Referring to FIG. 1, illustrated is a schematic illustration of an environment in which a heating arrangement 100 of the present disclosure may be practiced, in accordance with an embodiment of the present disclosure. As shown, the heating arrangement 100 is arranged on a floor area, such as a deck 102 of a ship. The heating arrangement 100 accordingly enables in heating the deck 102. The heating arrangement 100 comprises a plurality of heating modules, such as heating modules 110, 112 and 114, electrically coupled to each other. Further, the heating modules 110, 112, 114 are arranged in a manner (for example in a series to form a cascade) such that a required floor area, such as a walkable area of the deck 102, is covered. Alternatively, the heating arrangement 100 may include large number of heating modules to cover the entire deck 102.

The heating arrangement 100 further comprises an electrical cable 120 electrically coupled to at least one of the heating modules for providing electrical power from a power source to the heating modules 110, 112, 114. As shown, the electrical cable 120 is electrically coupled to the heating module 112 at one end, and at another end includes a plug 122 inserted in a socket of a switch board 124 for receiving electrical power for heating the heating modules 110, 112, 114. The electrical power supply is provided by engines of the ship which may run on diesel, steam and the like.

FIG. 1 is merely an example, which should not unduly limit the scope of the present disclosure. A person skilled in the art will recognize many variations, alternatives, and modifications of embodiments of the present disclosure. For example, the heating arrangement 100 can be used in conjunction with residential and commercial buildings for heating a floor and stairs thereof.

Figure 2:
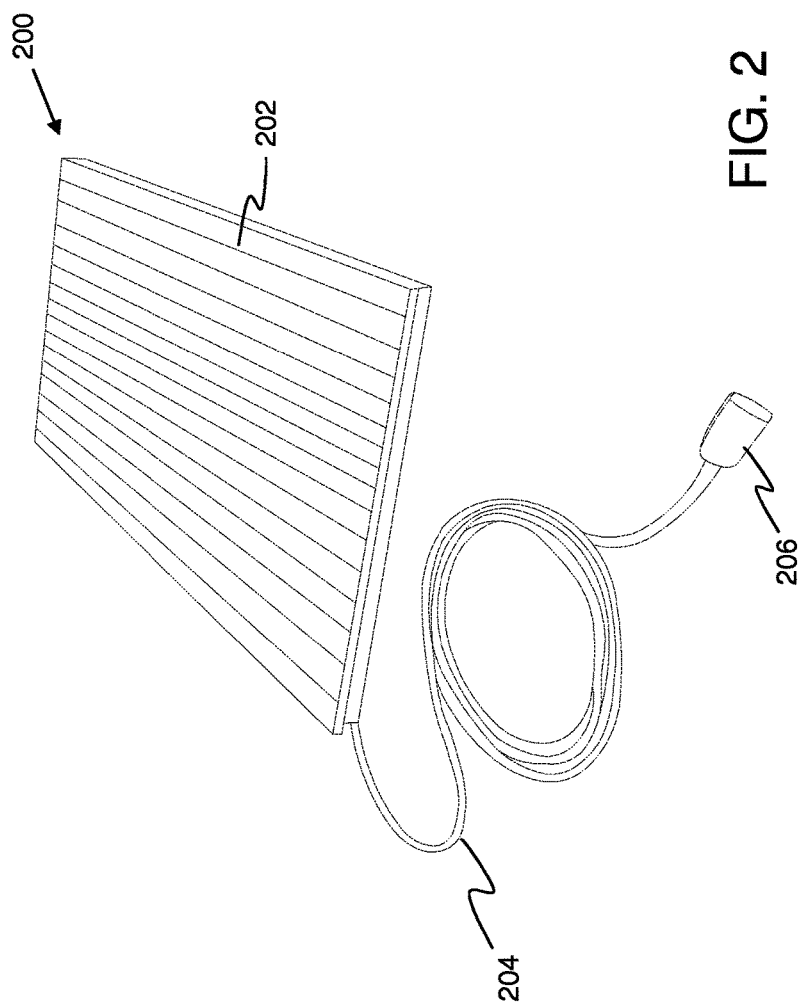
FIGS. 2 and 3 are perspective views of a heating module of the heating arrangement of FIG. 1, in accordance with an embodiment of the present disclosure.
Figure 3:
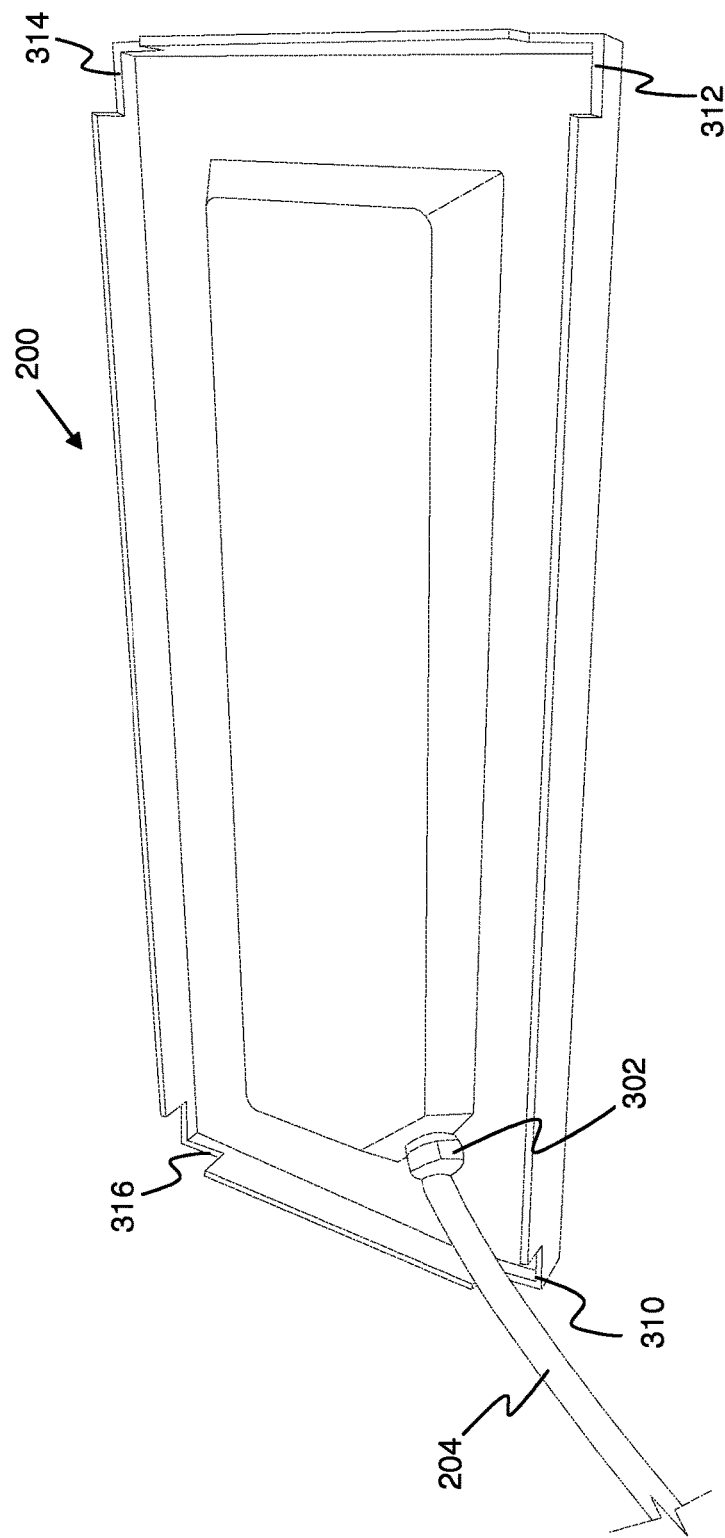

Referring now to FIGS. 2-3, illustrated are perspective views of a heating module 200 (such as the heating module 112 of the heating arrangement 100 of FIG. 1), in accordance with an embodiment of the present disclosure. For example, FIG. 2 illustrates a top perspective view of the heating module 200 and FIG. 3 illustrates a bottom perspective view of the heating module 200. As shown in FIG. 2, the heating module 200 comprises a surface 202. The surface 202 is formed to have good frictional grip for providing non-slippery surface, for example, for walking thereon. Further, the heating module 202 further comprises an electrical cable 204 coupled to the heating module 200 at one end and at another end includes a plug 206.

As shown in FIG. 3, the heating module 200 further comprises a seal element 302 for providing sealed connection between a heating cable (not shown) arranged inside the heating module 200 and the electrical cable 204. Specifically, the seal element 302 provides an opening through which an end of the electrical cable 204 is received and electrically coupled to a connector element of the heating cable, which will be explained in greater detail herein later. The seal element 302 accordingly provides a water proof coupling between the electrical cable 204 and the heating cable arranged inside the heating module 200.

The heating module 200 also comprises cut-out sections, such as cut-out sections 310, 312, 314 and 316, made peripherally on the heating module 200. The cut-out sections 310-316 are made to allow electrical cables to pass therethrough for allowing the heating module 200 to suitably rest on a flat floor area, such as the deck 102 shown in FIG. 1. As shown, the cut-out section 310 allows the electrical cable 204 to pass therethrough. Similarly, the other cut-out sections 312, 314, 314 may enable electrical cables, that electrically couple heating modules together to form a heating arrangement (such as the heating arrangement 100 of FIG. 1), to pass therethrough. This enables the heating module 200 (or the heating arrangement 100 of FIG. 1) to suitably rest on the flat floor area with proper balance.

Figure 4:
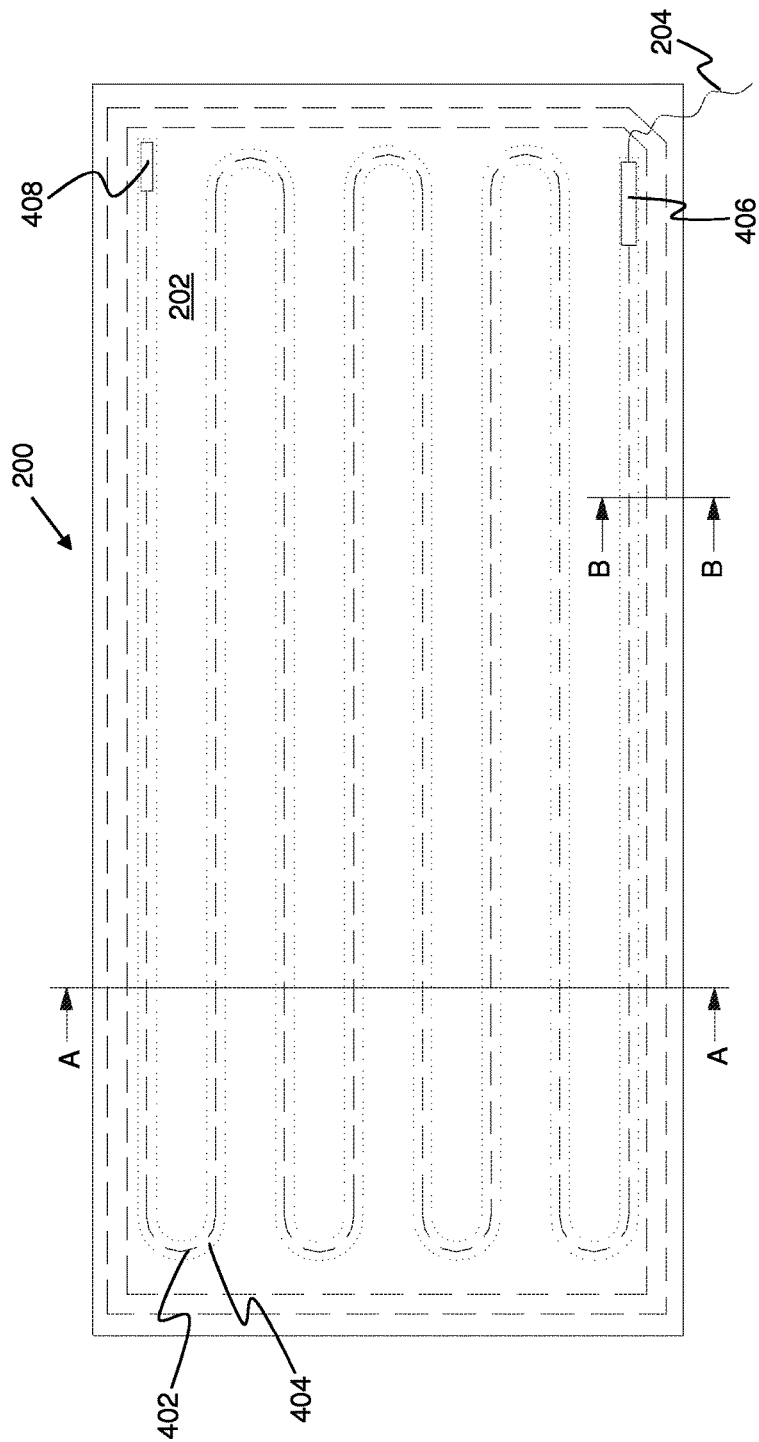
FIG. 4 is a top view of the heating module, in accordance with an embodiment of the present disclosure.

Referring now to FIG. 4, illustrated is a top view of the heating module 200, in accordance with an embodiment of the present disclosure. Specifically, FIG. 4 depicts the surface 202 and internal components beneath the surface 202 of the heating module 200. As shown, the heating module 200 comprises a heating cable 402 installed in a channel 404. Specifically, the channel 404 is made in a loop type shape and the heating cable 402 is arranged therein to cover a maximum area of the heating module 200. As shown, the heating cable 402 comprises a connector element 406 at one end and a termination point 408 at other end. The connector element 406 is electrically connected to the electrical cable 204 for receiving electrical energy from the power source.

Figure 5:
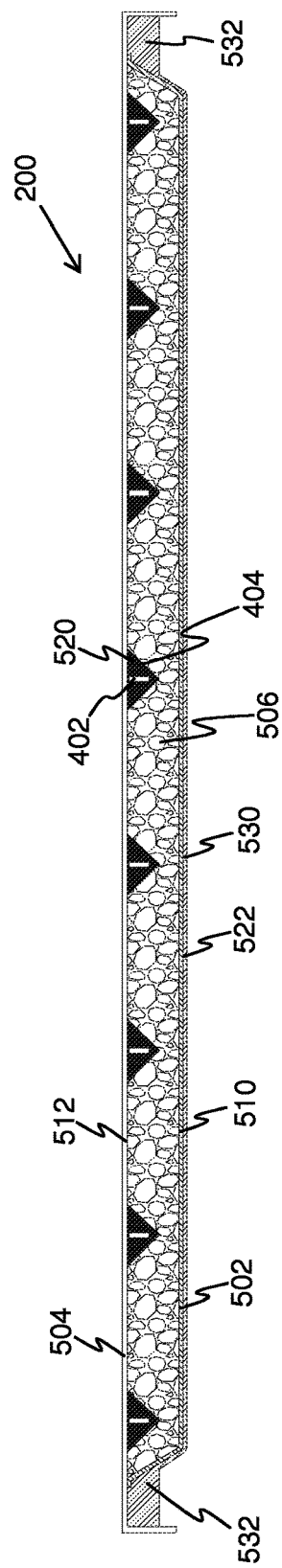
FIGS. 5 and 6 are sectional views of the heating module along axes A-A and B-B of FIG. 4, in accordance with an embodiment of the present disclosure.
Figure 6:
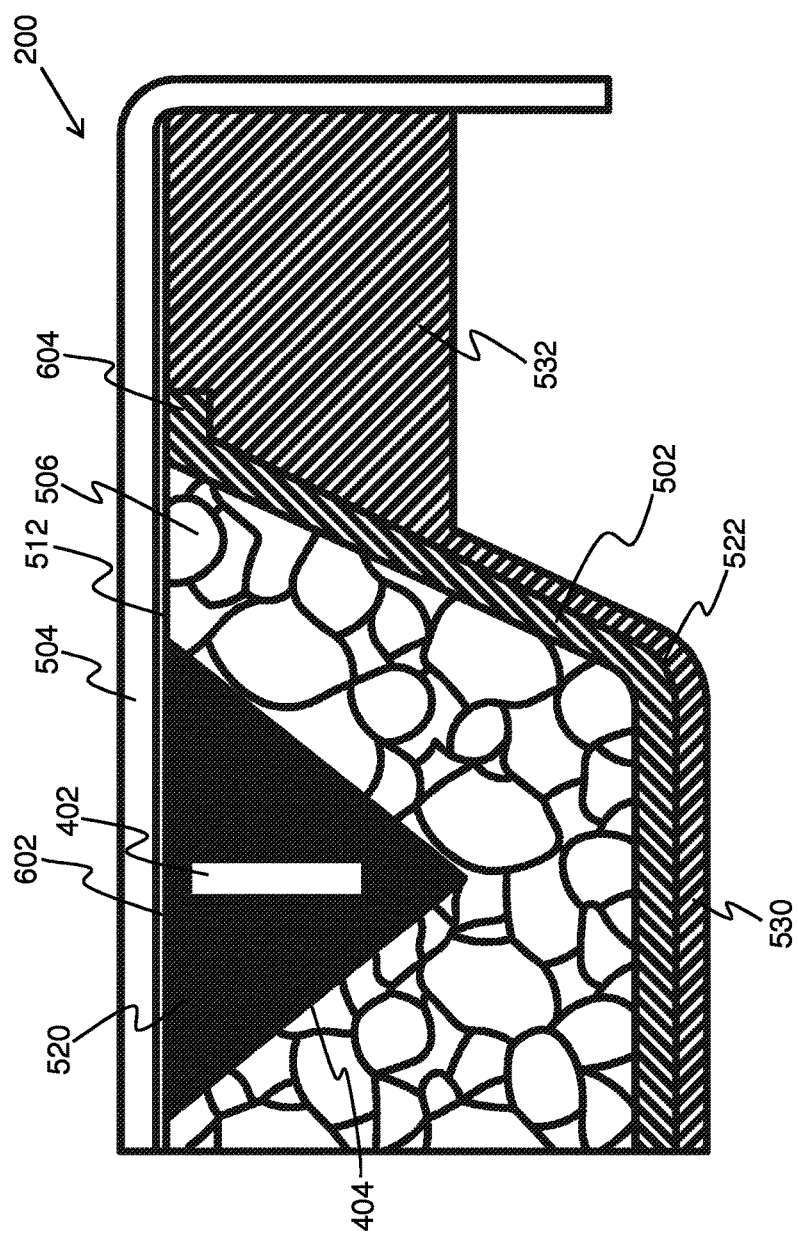

Referring now FIGS. 5 and 6, illustrated are sectional views of the heating module 200 of FIG. 4 along axes A-A and B-B, respectively, in accordance with an embodiment of the present disclosure. As shown in FIG. 5, the heating module 200 comprises a first conductive layer 502 and a second conductive layer 504 positioned opposite to the first conductive layer 502. The heating module 200 also comprises an intermediate insulating layer 506 positioned between the first and the second conductive layers 502 and 504. Specifically, the first conductive layer 502 is arranged on a first surface 510 of the intermediate insulating layer 506, and the second conductive layer 504 is arranged on a second surface 512 of the intermediate insulating layer 506. Further, the intermediate insulating layer 506 comprises the channel 404 (also shown in FIG. 4) on the second surface 512 of the intermediate insulating layer 506 positioned adjacent to the second conductive layer 504. The channel 404 receives the heating cable 402 (also shown in FIG. 4) therein. The intermediate insulating layer 506 also comprises a conductive filling material 520 filling the channel 404 and covering the heating cable 402.

The heating module 200 also comprises a sealing layer 530 arranged on a surface 522 of the first conductive layer 502 opposite to the intermediate insulating layer 506. The sealing layer 530 is adapted to cover the surface 522 and edges of the first conductive layer 502 to attach the first conductive layer 502 with the second conductive layer 504. As shown, the sealing layer 530 is configured to be thicker along the edges as compared to the surface 522 of the first conductive layer 502. As shown, the sealing layer 530 includes thicker portions 532 that cover the edges of the first conductive layer 502. Alternatively, the heating module 200 may include a sealing layer (not shown) adapted to cover edges of the first conductive layer 502, the intermediate insulating layer 506 and the second conductive layer 504 for sealing the entire heating module 200. The heating module 200 also comprises a conductive adhesive coating (shown in FIG. 6) between the second conductive layer 504 and the second surface 512 of the intermediate insulating layer 506.

Referring now to FIG. 6, illustrated is the sectional view of the heating module 200 along the axis B-B of FIG. 4. Specifically, FIG. 6 illustrates a portion of FIG. 5, i.e. an enlarged sectional view corresponding to the portion of FIG. 5. As shown, the heating module 200 comprises a conductive adhesive coating 602 between the second conductive layer 504 and the second surface 512 of the intermediate insulating layer 506. FIG. 6 also illustrates other components of the heating module 200, such as the heating cable 402, the channel 404 and the conductive filling material 520, of the intermediate insulating layer 506. Also, shown is the sealing layer 530 arranged on the surface 522 of the first conductive layer 502 opposite to the intermediate insulating layer 506. Further, shown is the thicker portion 532 of the sealing layer 530 that covers edges, such as an edge 604 of the first conductive layer 502.

Figure 7:
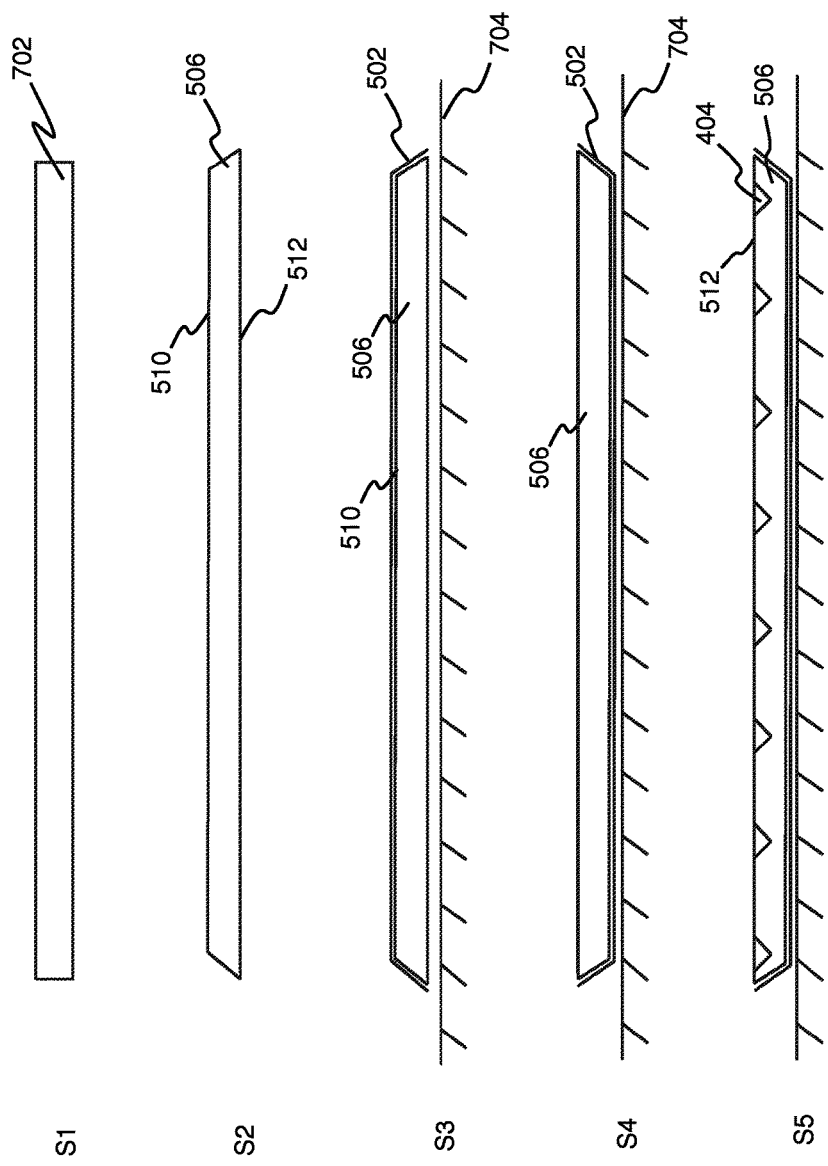
FIGS. 7 and 8 are illustration of various steps involved in manufacturing the heating module, in accordance with an embodiment of the present disclosure.
Figure 8:
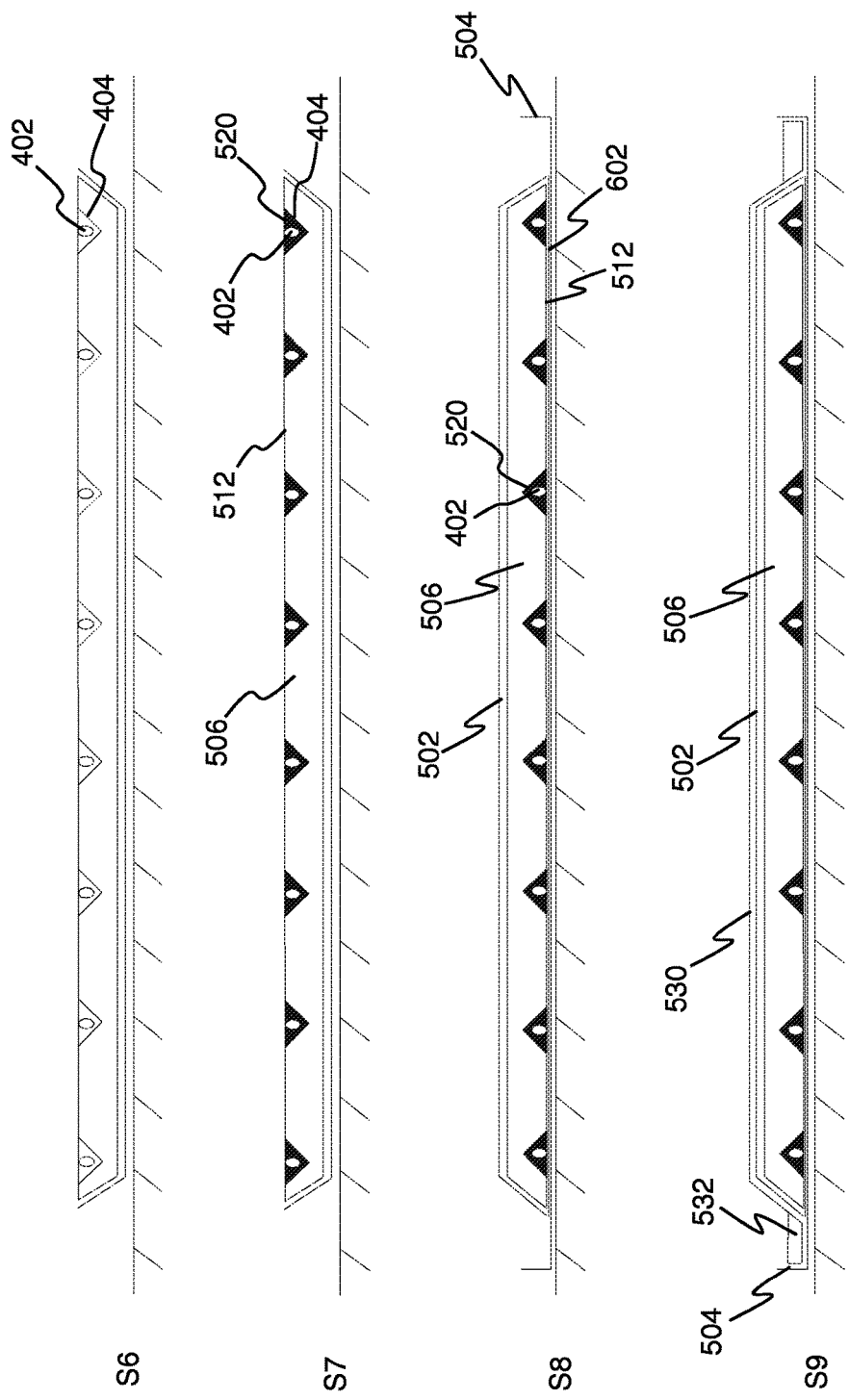

Referring now to FIG. 7 and FIG. 8, illustrated are various steps involved in manufacturing a heating module, such as the heating module 200, in accordance with an embodiment of the present disclosure. Specifically, FIG. 7 illustrates steps S1 to S5 and FIG. 8 illustrates steps S6 to S9 involved in manufacturing the heating module 200.

At step S1, provided is a piece 702 of an insulating material (such as polyurethane foam). As shown, the piece 702 includes a rectangular (particularly cubical shape).

At step S2, the piece 702 of the insulating material is modified to form the intermediate insulating layer 506. The intermediate insulating layer 506 comprises the first surface 510 and the second surface 512 opposite to the first surface 510. As shown, the intermediate insulating layer 506 is configured to have a rectangular frustum shape.

At step S3, the modified piece 702 of the insulating material is arranged on a surface 704, such table, desk and the like, and the first conductive layer 502 is arranged on the first surface 510 of the intermediate insulating layer 506. For example, the first conductive layer 502 is placed on the first surface 510 of the intermediate insulating layer 506, and thereafter vacuum laminated, for attaching the first conductive layer 502 and the intermediate insulating layer 506.

At step S4, an assembly of the first conductive layer 502 and the intermediate insulating layer 506 is turned around such that the first conductive layer 502 is in contact with the surface 704.

At step S5, the channel 404 is made into the second surface 512 of the intermediate insulating layer 506. As shown, the channel 404 is configured to have a triangular shape. Further, the channel 404 is made in a loop type shape such that the channel 404 covers a maximum area of the second surface 512 of the intermediate insulating layer 506.

At step S6, the heating cable 402 is arranged in the channel 404.

At step S7, the channel 404 is filled with the conductive filling material 520 to cover the heating cable 402 arranged in the channel 404. Specifically, the conductive filling material 520 is poured into the channel 404 to encapsulate the heating cable 402 and is poured in the channel 404 to a level of the second surface 512 of the intermediate insulating layer 506.

At step S8, an assembly of the first conductive layer 502 and the intermediate insulating layer 506 (having the heating cable 402 encapsulated with the conductive filling material 520) is turned around and placed on the second conductive layer 504. Specifically, the second conductive layer 504 is attached to the second surface 512 of the intermediate insulating layer 506 with the conductive adhesive coating 602 (also shown in FIG. 6).

At step S9, the sealing layer 530 is arranged on the first conductive layer 502 opposite to the intermediate insulating layer 506. As shown, the sealing layer 530 covers the surface 522 (shown in FIG. 6) and edges (shown in FIG. 6) of the first conductive layer 502 to attach the first conductive layer 502 with the second conductive layer 504. Further, the sealing layer 530 is configured to be thicker along the edges as compared to over the surface 522 of the first conductive layer 502. For example, the sealing layer 530 includes thicker portions 532 that cover the edges of the first conductive layer 502.

Figure 9:
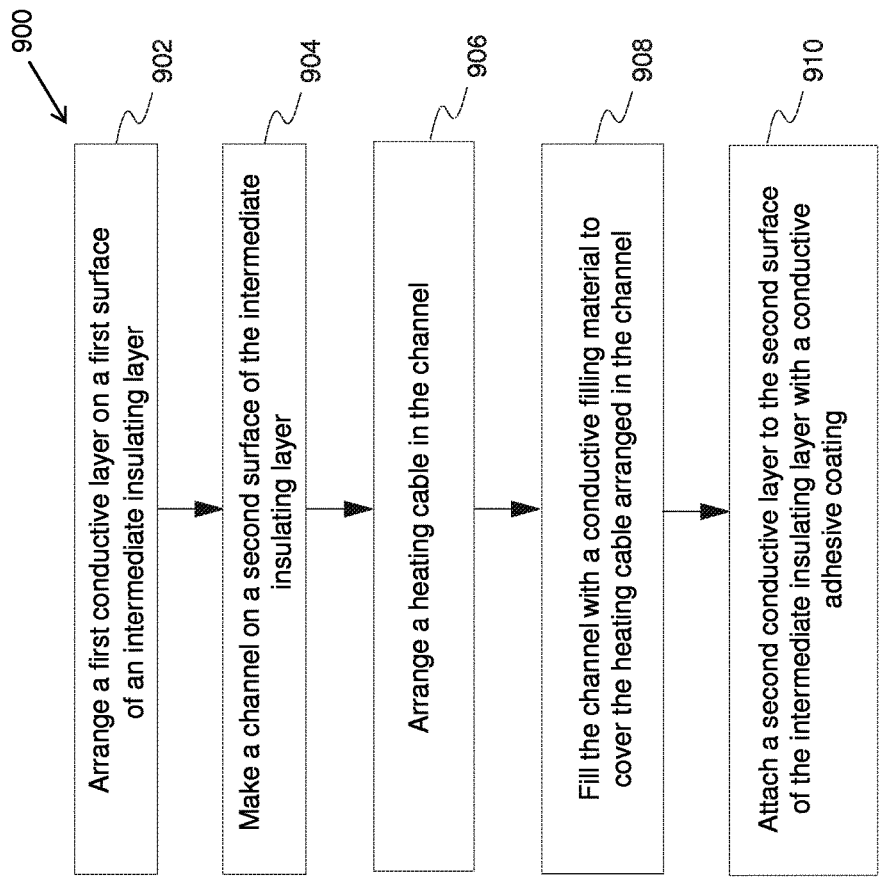
FIG. 9 is an illustration of steps of a method for manufacturing a heating module, in accordance with an embodiment of the present disclosure.

Referring to FIG. 9, illustrated are steps of a method 900 for manufacturing a heating module, in accordance with an embodiment of the present disclosure. Specifically, the method 900 illustrates the steps of manufacturing a heating module, such as the heating module 200, explained in conjunction with the FIGS. 1-8.

At step 902, a first conductive layer is arranged on a first surface of an intermediate insulating layer.

At step 904, a channel is made on a second surface of the intermediate insulating layer.

At step 906, a heating cable is arranged in the channel.

At step 908, the channel is filled with a conductive filling material to cover the heating cable arranged in the channel.

At step 910, a second conductive layer is attached to the second surface of the intermediate insulating layer with a conductive adhesive coating.

The steps 902 to 910 are only illustrative and other alternatives can also be provided where one or more steps are added, one or more steps are removed, or one or more steps are provided in a different sequence without departing from the scope of the claims herein. For example, the method 900 further includes sealing edges of the layers together with a sealing material. Alternatively, the method 900 includes arranging a sealing layer made of the sealing material on a surface of the first conductive layer opposite to the intermediate insulating layer.

Modifications to embodiments of the present disclosure described in the foregoing are possible without departing from the scope of the present disclosure as defined by the accompanying claims. Expressions such as "including", "comprising", "incorporating", "have", "is" used to describe and claim the present disclosure are intended to be construed in a non-exclusive manner, namely allowing for items, components or elements not explicitly described also to be present. Reference to the singular is also to be construed to relate to the plural.

The invention claimed is:

1. A heating module for heating a floor area, the heating module comprising:
   a first conductive layer comprising a hollow frustum box structure with walls comprising edges extending laterally from a base of the hollow frustum box structure;
   a second conductive layer positioned opposite to the first conductive layer, the second conductive layer comprising a laterally extending base and parts extending perpendicular to the laterally extending base, wherein the walls and the laterally extending edges of the first conductive layer rest on the laterally extending base of the second conductive layer;
   an intermediate frustum shaped insulating layer positioned between the first and the second conductive layers, the intermediate frustum shaped insulating layer comprising
   a channel on a surface of the intermediate frustum shaped insulating layer, positioned adjacent to the second conductive layer,
   a heating cable received in the channel, and
   a conductive filling material filling the channel and covering the heating cable; and a conductive adhesive coating between the second conductive layer and the surface of the intermediate frustum shaped insulating layer;

sealing layer adapted to be rested on the floor area, the sealing layer comprising portions covering the laterally extending edges of the first conductive layer and covering intersections of the laterally extending base and perpendicularly extending parts; and an electrical cable electrically coupled to the heating module for providing electrical power from a power source to the heating module.

2. A The heating module according to claim 1, wherein the sealing layer covers the intermediate frustum shaped insulating layer.

3. A The heating module according to claim 1, wherein the sealing layer is arranged on a surface of the first conductive layer opposite to the intermediate frustum shaped insulating layer.

4. A The heating module according to claim 1, further comprising a seal element for providing sealed connection between the heating cable and the electrical cable.

5. A The heating module according to claim 1, wherein the intermediate frustum shaped insulating layer is positioned in a cavity formed by the first and the second conductive layers.

* * * * *